United States Patent
Fischer

(10) Patent No.: US 9,605,940 B2
(45) Date of Patent: Mar. 28, 2017

(54) MEASURING PROBE FOR MEASURING THE THICKNESS OF THIN LAYERS, AND METHOD FOR THE PRODUCTION OF A SENSOR ELEMENT FOR THE MEASURING PROBE

(75) Inventor: Helmut Fischer, Oberägeri (CH)

(73) Assignee: Helmut Fischer GbmH Institut für Elektronik und Messtechnik, Sindelfingen (DE)

( * ) Notice: Subject to any disclaimer, the term of this patent is extended or adjusted under 35 U.S.C. 154(b) by 307 days.

(21) Appl. No.: 14/119,953

(22) PCT Filed: May 24, 2012

(86) PCT No.: PCT/EP2012/059691
§ 371 (c)(1),
(2), (4) Date: Mar. 27, 2014

(87) PCT Pub. No.: WO2012/160132
PCT Pub. Date: Nov. 29, 2012

(65) Prior Publication Data
US 2014/0203802 A1    Jul. 24, 2014

(30) Foreign Application Priority Data

May 25, 2011   (DE) .......................... 10 2011 103 122
May 25, 2011   (DE) .......................... 10 2011 103 123

(51) Int. Cl.
*G01B 7/06*   (2006.01)

(52) U.S. Cl.
CPC .............. *G01B 7/10* (2013.01); *G01B 7/105* (2013.01); *Y10T 29/49071* (2015.01)

(58) Field of Classification Search
CPC .. G01B 7/10; G01B 7/105; G01B 7/06; Y10T 29/49071

(Continued)

(56) References Cited

U.S. PATENT DOCUMENTS 2,933,677 A * 4/1960 Lieber .................... G01B 7/105
                                                        324/230
3,855,561 A   12/1974 Gottschalt
3,986,105 A * 10/1976 Nix ........................ G01B 7/105
                                                        324/230

(Continued)

FOREIGN PATENT DOCUMENTS

CN      1519535 A     8/2004
CN      1975319 A     6/2007

(Continued)

OTHER PUBLICATIONS

International Search Report for corresponding patent application No. PCT/EP2012/059691 dated Aug. 23, 2012.
Japanese Office Action with English translation for corresponding Japanese Patent Application No. 2014-511870 mailed Jan. 26, 2016.
Japanese Office Action with English translation dated Nov. 24, 2016, for corresponding JP Patent Application No. 2014-511870.

*Primary Examiner* — Jay Patidar
(74) *Attorney, Agent, or Firm* — Renner, Otto, Boisselle and Sklar LLP

(57) ABSTRACT

The invention relates to a measuring probe for measuring the thickness of thin layers with a housing, having at least one sensor element, which is received in the housing at least slightly moveably along a longitudinal axis and which comprises at least one winding device, which is allocated to the longitudinal axis, having a spherical positioning cap facing the outer front face of the housing, said cap being arranged in the longitudinal axis, wherein the spherical positioning cap has a basic body that has a cylindrical core section and a pole cap arranged on a front face of the core section, wherein the winding device is allocated to the spherical positioning cap, said winding device being formed from a discoidal or annular carrier with at least one Archimedean coil arranged thereon and with the basic body consisting of a ferritic material and the pole cap consisting of a hard metal.

20 Claims, 4 Drawing Sheets

Figure 1:
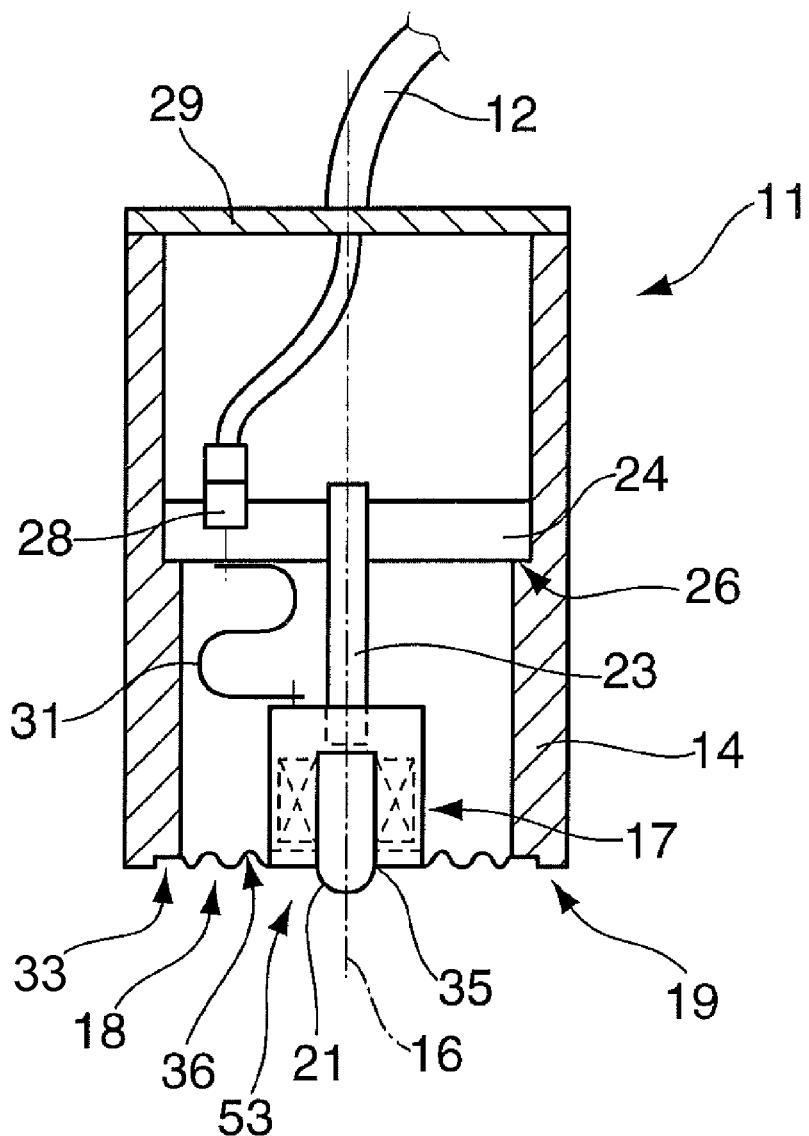

(58) Field of Classification Search
USPC .................................................. 324/228–243
See application file for complete search history.

(56) References Cited

U.S. PATENT DOCUMENTS

| | | | | |
|---|---|---|---|---|
| 4,041,378 A | * | 8/1977 | Ott | G01B 7/105 324/230 |
| 4,618,825 A | * | 10/1986 | Fischer | 324/230 |
| 4,829,251 A | | 5/1989 | Fischer | |
| 5,191,286 A | * | 3/1993 | Fischer | 324/230 |
| 5,421,946 A | * | 6/1995 | Flaig | 156/361 |
| 6,777,930 B2 | | 8/2004 | Fischer | |
| 6,977,498 B2 | * | 12/2005 | Scherzinger | G01B 7/105 324/229 |
| 7,472,491 B2 | * | 1/2009 | Fischer | 33/561 |
| 2003/0067298 A1 | | 4/2003 | Nagano | |
| 2003/0090266 A1 | | 5/2003 | Kesil et al. | |

FOREIGN PATENT DOCUMENTS

| | | | |
|---|---|---|---|
| CN | 101074864 A | 11/2007 | |
| CN | 101398286 A | 4/2009 | |
| DE | 33 31 407 C2 | 3/1985 | |
| DE | 100 14 348 B4 | 9/2001 | |
| DE | 103 48 652 A1 | 5/2004 | |
| DE | 4119903 C5 * | 6/2005 | ............ G01B 7/105 |
| DE | 10 2005 054 593 A1 | 5/2007 | |
| DE | 699 35 610 T2 | 11/2007 | |
| EP | 0 203 536 B1 | 8/1989 | |
| JP | 2001-289606 | 10/2001 | |
| JP | 2001-343205 A | 12/2001 | |
| JP | 2005-227256 A | 8/2005 | |
| WO | 0034734 A1 | 6/2000 | |
| WO | 2010/044670 A2 | 4/2010 | |
| WO | WO 2012160131 A1 * | 11/2012 | |

* cited by examiner

MEASURING PROBE FOR MEASURING THE THICKNESS OF THIN LAYERS, AND METHOD FOR THE PRODUCTION OF A SENSOR ELEMENT FOR THE MEASURING PROBE

The invention relates to a measuring probe for measuring the thickness of thin layers and a method for the production of a sensor element for the measuring probe according to the respective preamble of the independent claims.

A measuring probe for measuring the thickness of thin layers is known from DE 10 2005 054 593 A1. This measuring probe comprises a housing in which at least one sensor element is provided, which is received in the housing at least slightly moveably along a longitudinal axis of the housing. The sensor element comprises at least one first and one second winding device, which is received by a pot core. The pot core comprises a central pin, on whose end facing the housing a spherical positioning cap is provided. The pot core with the sensor element arranged thereon and the spherical positioning cap is received by an elastically flexible holding element, which is fastened to a front end of the housing.

Such measuring probes are suitable for measuring layer thickness according to the magnetic induction method, wherein the thickness of non-ferrous metals on magnetic base materials can be determined non-destructively. Alternatively, the sensor element can have a Hall effect sensor for measuring layer thickness, such that layer thickness measuring is possible according to the eddy current method, in order to record the thickness of electrically non-conductive layers on non-ferrous metals non-destructively.

Furthermore, it is known from DE 699 35 610 C2 to apply an electrical measuring element for measuring the thickness of layers by means of an inductive eddy current method, wherein a coil made from an electrically conductive material is formed in such a way that it comprises at least one helical part. In this case, a respective helical coil can be provided on both sides of a carrier element, said coil extending helically outwards from a central point in a radial manner. To carry out the measuring method, it is necessary for this electrical measuring element to be positioned close to—yet with a space to—the object to be measured. This requires additional tools to position the measuring element close to the object to be measured. Due to the positioning the measuring element with a space to the object to be measured, this has too great a space, whereby the measuring sensitivity is reduced and thus the measuring accuracy decreases.

The specifications for measuring accuracy in measuring devices are always increasing. Moreover, the measuring process should also be simplified, such that, in particular, tactile measuring devices are used. These tactile measuring devices must not only be designed to be smaller, in order to eliminate geometric disturbances, such as bent measuring surfaces and to achieve a larger field of application, but they must also have a smaller mass in order to avoid damaging the measuring surface when the measuring probe is fitted.

The object of the invention is to further develop a measuring probe such that the increased specifications for measuring accuracy are fulfilled. Furthermore, the object of the invention is to propose a method for the production of a winding device for such a measuring probe.

The object is solved according to the invention by the features of the measuring probe according to claim 1. Further advantageous embodiments and developments are specified in the further claims.

The embodiment according to the invention of the measuring probe for the tactile measurement of the thickness of thin layers having at least one first winding device, which consists of a discoidal or annular carrier and at least one Archimedean coil arranged thereon, has that advantage that a very small, in particular flat, measuring probe can be created. With the embodiment of at least one Archimedean coil, it can furthermore be achieved that the lines of force of the magnetic field are guided by the Archimedean coil along the front of the housing of the measuring probe and thus can be led closer to the surface of the layer to be measured, whereby a higher resolution in the evaluation of the measuring results can be achieved. In particular, with such an embodiment of the measuring probe according to the invention, a small, tactile measuring probe can be created, which records layer thicknesses on non-ferrous metals or non-ferrous substrates according to the eddy current method. With this embodiment, the high-frequency field can be led virtually directly onto the measuring surface, whereby a very high level of sensitivity of the measuring probe, and thus a high resolution, can be achieved, whereby thinner layer thicknesses can also be tactilely recorded. At the same time, due to the use of ferritic material for the basic body of the spherical positioning cap, an improved measuring sensitivity during the layer thickness measurement is enabled according to the eddy current method. The pole cap consisting of hard metal increases the wear resistance for the measuring probe during the tactile measurement. Despite the central arrangement of the spherical positioning cap and the Archimedean coil connected thereto, whose first winding lies with a space to the central longitudinal axis, the measuring sensitivity is improved due to the basic body made from a ferritic material. This is because, in a high-frequency magnetic alternating field for carrying out the eddy current method, direct conveyance of the magnetic field to the measuring surface is improved by the ferritic basic body. Moreover, in the embodiment of the measuring probe according to the invention, this is furthermore accompanied by a lifting effect of the spherical positioning cap to the measuring surface being able to occur in this region for the pole cap of the spherical positioning cap formed from a hard metal.

A rounded bearing surface is preferably provided on the core section of the spherical positioning cap, in the longitudinal axis of which bearing surface the pole cap is arranged. Thus, the bearing surface of the basic body is formed by the pole cap consisting of hard metal and thus achieves an increased level of wear resistance. It is furthermore enabled that, during the fitting onto the object to be measured, a high level of mechanical resistance is provided, as well as the high-frequency field being able to be led very close to the object to be measured during the eddy current method, such that, in turn, an increased level of measuring sensitivity is achieved.

According to a further preferred embodiment of the spherical positioning cap, provision is made for the pole cap to extend over the entire rounded bearing surface or to be designed smaller. Depending on the diameter of the spherical positioning cap, both the first and the second embodiment can be selected. However, it is preferable to select a pole cap that is smaller than the rounded bearing surface, the central point of which pole cap lies in the longitudinal axis of the basic body, such that a smaller contact point or a bearing surface with a hard-metal pole cap is produced.

A first embodiment of the spherical positioning cap provides that the pole cap is produced by a hard metal coating. In such an embodiment, a coating applied, for example, to a front face of the basic body or to the rounded bearing surface, can be provided, which is finished by polishing. Such a coating can, for example, be a TiC coating or similar, which comprises, for example, a layer thickness from 1 μm to 10 μm, in particular 2 μm. Likewise, the coating can also be applied to a slightly hollowed-out region around the longitudinal axis of the front face of the basic body or the rounded bearing surface and then polished together.

An alternative embodiment of the spherical positioning cap provides that the pole cap is formed by a hard metal core, which preferably extends completely through the basic body. Such a hard metal core can be formed as a hard metal pin, which extends along the longitudinal axis.

Alternatively, the diameter of the rounded bearing surface or of a front side of the basic body can be smaller than the core section of the basic body and the pole cap can be provided on the tapered holding section, which has a rounded or tiered transition to the core section. With this arrangement, the lines of force can be concentrated within the spherical positioning cap with respect to the contact point. Furthermore, due to the holding section that has a reduced diameter compared to the core section, a winding device with a reduced diameter can be positioned around the holding section. Thus, a higher level of measuring sensitivity, in particular for very thin layers, is in turn enabled.

An alternative embodiment of the invention provides the carrier of the winding device on the tapered holding section of the basic body of the spherical positioning cap. Thus, a reduction in the coil diameter is provided, whereby an improved measurement of thin layers, so layers in the region of less than 100 μm, in particular less than 10 μm, is in turn tactilely enabled.

A further preferred embodiment of the spherical positioning cap provides that the height of the holding section on the basic body of the spherical positioning cap substantially corresponds to the thickness of the carrier of the winding device. Thus, at the same time, a correct positioning of the carrier with respect to the spherical positioning cap, or vice versa, can be enabled by this embodiment. The carrier of the winding device is preferably formed from a semiconducting material, in particular silicon or germanium.

A further preferred embodiment of the spherical positioning cap provides a flat contact surface opposite the basic body of the pole cap. Thus, the spherical positioning cap can be produced with simple geometry.

An iron oxide or a material that is similar to iron oxide is preferably used as the ferritic material for the spherical positioning cap. This material can be cylindrically ground with precision for the production of a rounded pole cap for an increased level of field concentration. Alternatively, a plastic material with iron particles introduced therein can be used as the ferritic material.

According to a preferred embodiment of the invention, the first winding device comprises a single-layer Archimedean coil on the carrier. This preferred embodiment is simple to produce and is particularly flat, in particular in the case of a carrier that is formed flat, whereby a small construction space is sufficient for the winding device.

According to a further preferred embodiment of the invention, the at least one, preferably single-layer, Archimedean coil of the first winding device is arranged pointing towards the front face of the housing, which front face is directly opposite the measuring surface during the measuring of the layer thickness. A particularly close arrangement of the winding device to the measuring surface is thus enabled, wherein the distance from the second winding device to the measuring surface is determined by the gap between a contact point or a rounded pole cap of a spherical positioning cap and the coil of the second winding device.

According to a preferred embodiment of the invention, at least one second winding device is provided on the carrier, which is formed as at least one further Archimedean coil. Thus, a first inner coil and a second outer coil enclosing this can be applied to the same side of the annular or discoidal carrier, such that these coils preferably lie in a mutual plane. Thus, the respective coils are allocated directly to the measuring surface of the object to be measured, whereby an improved level of measuring accuracy is achieved. Alternatively, the first inner coil can be provided on the carrier, facing the measuring surface, and the second outer coil can be arranged on the opposite side of the carrier.

In this alternative embodiment, the carrier receives the at least one first and at least one second coil, preferably as a respective Archimedean coil, and the carrier is preferably arranged on a front end of a housing of the sensor element. Thus, a very small and sensitive measuring probe can be created, which can be used in particular during a measurement of layer thickness in the field of micromechanics or microelectronics.

Furthermore, provision is preferably made for the first and second coil to be arranged opposite each other on the carrier and for the coil that comprises more windings than the other coil to cover this at least partially. Here, provision is preferably made for the coil with fewer windings to be provided for measuring the layer thickness and for the coil with more windings compared thereto to be used to compensate for the bending of the measuring surface or to determine whether the layer to be measured lies inside a plane or outside a plane.

A further embodiment of the winding device provides that the first coil, with fewer windings, for measuring the layer thickness and the second coil, with more windings compared thereto, for determining the measuring surface with respect to a deviation from a plane, can be charged with a frequency of more than 1 MHz.

A further preferred embodiment of the invention provides an insulating layer on the first winding device having the at least one Archimedean coil. This insulating layer serves as a protective layer against damage or corrosion.

In a further embodiment, the winding device is allocated to a spherical positioning cap or arranged directly adjacent to a pole cap or adjoining it, such that the spherical positioning cap can be fastened in a sensor housing or the carrier can be fastened in a sensor housing of the sensor element by an adhesive, latching or plug connection.

In order to produce the at least one first winding device, the carrier preferably consists of an electrically non-conductive and non-magnetic material. In particular, the carrier is produced from a semi-conductive material such as germanium or silicon, in particular germanium or silicon discs, which preferably have a thickness of less than 300 μm or less than 150 μm. A layer thickness of 100 μm, for example, is preferably selected for a silicon disc. Such materials are produced cost-effectively and possess neutral properties with respect to the high and low-frequency measurement of such a dual measuring probe having a first and second winding device.

A further preferred embodiment of a measuring probe provides a circuit for the coiling device on a discoidal carrier made from a semi-conductive material, in particular made from silicon or germanium, which circuit is implemented or inscribed. This arrangement in turn enables a preferably compact measuring probe that is to be formed to be small. Furthermore, this integration of the circuit into the carrier has the advantage that a simple circuitry arrangement and line connection to the winding device is provided, as well as there being unmoved parts present.

According to a preferred embodiment for the integration of the circuit into the measuring probe, the carrier is arranged on an outer side of the sensor housing, which faces the housing interior of the measuring probe, or on an inner side of the sensor housing. Alternatively, the carrier can also be arranged on a front face on a sensor housing, which front face points towards the outer side of the housing of the measuring probe. Thus, the compactness of such a measuring probe is further increased.

The object of the invention is furthermore solved by a method for the production of at least one sensor element for a measuring probe having at least one first winding device for a measuring probe, wherein at least one Archimedean coil is applied to an annular or discoidal carrier having a central opening, which coil preferably comes into contact with a respective connection point on the carrier. Thus, a winding device that is to be simply integrated into a sensor element can be created.

To produce the at least one first winding device, provision is made according to a first embodiment of the method for a metallic conductive layer to be applied to the carrier, which is then transferred into an Archimedean coil by removal of material, mechanical or chemical, or by material processing. In this production method, the carrier is, for example, completely coated with a metallic conductive layer, in particular a copper layer. Removal of material can then take place, for example by laser processing. Likewise, a corresponding removal can be created by lithography or by etching, such that at least one single-layer coil is applied to the carrier.

An alternative embodiment of the method for the production of the at least one first winding device having at least one Archimedean coil on a carrier provides that the at least one Archimedean coil is applied to the carrier by a vapour deposition process. Various vapour deposition methods can thereby be provided, which in particular comprise a high vapour deposition rate on metallic conductive layers.

A further embodiment of the method provides that at least one Archimedean coil is applied to the carrier via a winding process using a winding wire. Thus, during the winding process, a spacing of the adjacent windings is adjusted.

During the winding process, the winding wire is preferably adhered to the carrier and in particular fastened thereto using a press-on film. Here, very fine structures can themselves be produced with mechanical safety.

The invention and further advantageous embodiments and developments of the same are described and illustrated in greater detail below with the aid of the examples depicted in the drawings. The features to be gleaned from the description and the drawings can be applied according to the invention individually or together in any combination. Here are shown:

FIG. 1 a schematic sectional depiction of a first embodiment of the measuring probe according to the invention, FIG. 2 a schematically enlarged sectional view of a first embodiment of the sensor element of the measuring probe according to FIG. 1, FIG. 3 a schematic view from below onto the sensor element according to FIG. 2, FIG. 4 a schematically enlarged sectional view of a winding device, FIGS. 5 and 6 schematic side views for a winding process for the production of the second winding device, FIG. 7 a schematic sectional depiction of an alternative embodiment of the sensor element of the measuring probe according to FIG. 1, FIG. 8 a schematic sectional depiction of a further alternative embodiment of the sensor element of the measuring probe according to FIG. 1, and FIG. 9 a schematic sectional depiction of a further alternative embodiment of the sensor element of the measuring probe according to FIG. 1.

A sectional view of a measuring probe 11 for a device, which is not shown in greater detail, for measuring the thickness of thin layers is depicted schematically in FIG. 1. This measuring probe 11 is used for non-destructive measurement of layer thickness. This measuring probe 11 can, according to the exemplary embodiment, be provided separately from the data processing device of the device for measuring the thickness of thin layers and can transfer the recorded values via a connecting cable 12 or wirelessly. Alternatively, this measuring probe 11 can be part of the device for measuring the thickness of thin layers in the form of a stationary device or a hand-held device.

The measuring probe 11 has a housing 14, which is in particular formed cylindrically. At least one sensor element 17 is preferably arranged in a longitudinal axis 16 of the housing 14. This sensor element 17 is borne by a holding element 18, which is received on an end section 19 of the housing 14. A spherical positioning cap 21 is provided on the at least one sensor element 17 in the longitudinal axis 16 of the housing 14, which positioning cap can, during the fitting of the measuring probe 11, be positioned on a measuring surface of an object to be measured that is not depicted in greater detail, in order to determine a layer thickness on a base or carrier material.

The at least one sensor element 17 is designed to carry out a measurement according to the eddy current method, i.e. the measurement of the thickness of electrically non-conductive layers on non-ferrous metals, for example of paints, lacquers, plastics on aluminium, copper, brass, stainless steel or other anodized layers on aluminium, is enabled in a high-frequency alternating field. Thus, such a measuring probe 11 is a dual measuring probe.

The at least one sensor element 17 has, for example, a guide element 23 arranged coaxially with respect to the longitudinal axis 16, which guide element is displaceably received in a bearing 24 fixed to the housing. The precision for a tilt-free fitting movement of the measuring probe 11 on the measuring surface of the object to be measured is thus increased. The bearing 24 can be formed as an air bearing or low-friction plain bearing. This bearing 24 that is fixed to the housing is preferably arranged on a collar 26 of the housing 14, whereby, in turn, a simple and fast positioning of the bearing 24 is enabled in the radial and axial direction. The bearing 24 furthermore comprises a connector 28, which is provided to connect the connecting cable 12. Depending on the purpose, the housing 14 can be completed accordingly. In order to embody a stand-alone probe according to the exemplary embodiment, the housing 14 is, for example, closed with a cover 29 or lid after the connection of the connecting cable 12, such that a hand-operated measuring probe is connected to a stationary device via a connecting cable 12. When there is insertion into a hand-operated measuring probe or into a stationary device, the cover 29 can be dispensed with.

A flexible line 31 with several individual wires or a flexible conduction band is provided on the bearing 24 between the sensor element 17 and, for example, the connector 28, which conduction band withstands bending stress.

Such bending stress is effected by the lifting movement of the at least one sensor element 17 during the fitting of the probe on the surface of an object to be measured. In this instance, the sensor element 17 is dipped at least slightly into the housing 14. The holding element 18 is positioned in a depression 36 on the end section 19 of the housing 14.

The discoidally-formed holding element 18 is preferably fastened to a housingend-side depression 33 on the end section 19 of the housing 14. Thus, in turn, a radial and axial configuration is ensured in a simple manner. In a first embodiment, the holding element 18 is fastened media-impermeably in the depression 33. At the same time, the spherical positioning cap 21 and/or the sensor element 17 is provided media-impermeably with its housing in a bore-hole 35 of the holding element 18. Thus the housing 14 is hermetically sealed from the outside, such that an interference to the fitting movement and thus the dipping of the at least one sensor element 17 into the housing 14 is not provided by contamination.

The arrangement and assembly of the at least one sensor element 17 in the measuring probe 11 is only exemplary. Other embodiments of a measuring probe 11 for the longitudinally displaceable mounting of the at least one sensor element 17 in the housing 14 can also be provided.

Figure 2:
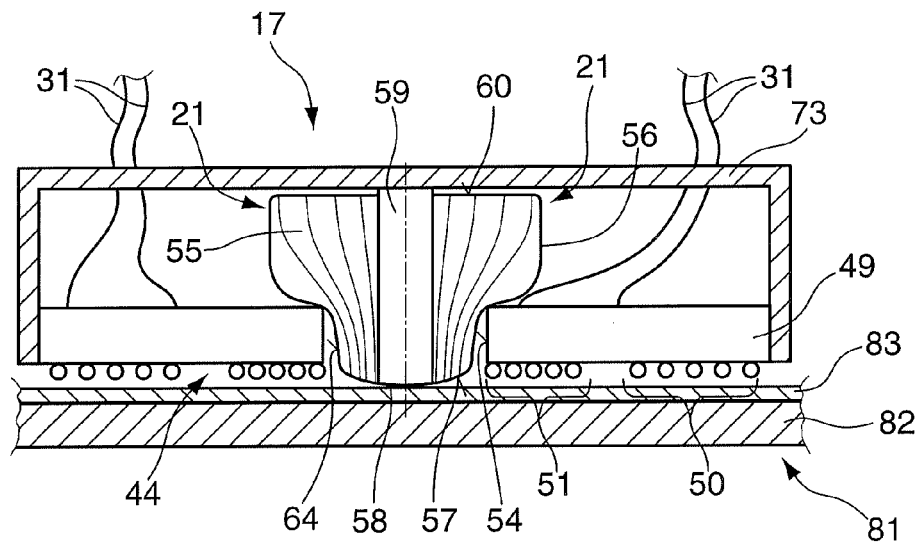

A first embodiment of the at least one sensor element 17 for a measuring probe 11 is depicted in enlarged form in FIG. 2. The sensor element 17 comprises a housing 73, which receives a first winding device 44. This first winding device 44 comprises a discoidal carrier 49, on which a coil 51 is provided in a single layer in an Archimedean manner. The coil 51 is arranged pointing towards the outer front face 53 of the housing 14. The first winding device 44 has a central opening 54, through which the spherical positioning cap 21 extends.

The spherical positioning cap 21 comprises a basic body 55, which has a cylindrical core section 56, at one end of which a rounded bearing surface 57 is provided. This rounded bearing surface 57 has a pole cap 58. This pole cap 58 extends only partially along the rounded bearing surface 57. The tactile fitting of the spherical positioning cap 21 on the measuring surface takes place in the region of the pole cap 58. The pole cap 58 is, for example, formed by a hard metal core 59 or hard metal pin 59. A flat contact surface 60 is provided opposite this rounded bearing surface 57.

In this embodiment, the spherical positioning cap 21 can have a pole cap 58, which is formed as an insert or a pin. For this, a hard metal is in particular provided, such that the pole cap 58 is more wear resistant than the material of the core section 57. The pole cap 58 can also be formed only as a coating made from hard metal. This can be formed with a smaller diameter than the rounded contact area or can cover the entire rounded bearing surface.

The spherical positioning cap 21 with the basic body 55 preferably consists of a ferritic material, in particular ferrite, and is also known as a ferrite pole. This ferritic material also comprises the group of oxide ceramic materials that contain permanently magnetic bipoles. The pole cap 58, which extends at least partially over a rounded bearing surface 57 as a front face of the spherical positioning cap 21, consists, for example, of a hard metal coating or a hard metal insert, for example made from TiC, TiN or Ti(c,n). A hard metal core in the form of a pin can be provided as the hard metal insert, which penetrates the spherical positioning cap 21. Alternatively, a hard metal solid ball or hard metal half ball can also be provided, which is used in the spherical positioning cap 21 and which forms the pole cap 58.

In the spherical positioning cap 21, the core section 56 has a tapered holding section 64, which is formed with a diameter that is smaller than the core section 56. Here, a preferably rounded transition region is provided, such that the magnetic field lines are concentrated in the holding section 64, i.e. these are concentrated away from the measuring point. With the tapered holding section 64, the advantage is furthermore achieved that the diameter of the Archimedean coil 51 is further diminished or can be reduced, whereby, in turn, thinner layers can be measured tactilely. In this embodiment, the diameter of the pole cap 58 is designed to be smaller than the rounded bearing surface 57, which is provided on the holding section 64, which in turn has a reduced diameter compared to the core section 56.

The carrier 49 can have a contour in the opening 54, said contour being adapted to the transition region between the holding section 64 and the core section 56, such that an accurate installation and arrangement are enabled. The radius of curvature in the transition region from the holding section 64 to the core section 56 can also be provided in the edge region of the opening 54 of the carrier 49.

In the sensor element 17 depicted in FIG. 2, a circuit 76, for example, is provided, which acts as a contact for the first and second coil 51, 50 of the winding device 44 via connecting lines 31. Alternatively, the electronic circuit can be implemented into the carrier 49 or applied or inscribed on the side of the carrier 49 that lies opposite the coils 51, 50.

In the winding device 44 according to FIG. 2, an inner coil 51 and an outer coil 50 are provided, wherein the outer coil 50 encloses the inner coil 51 and both are preferably arranged on the same side of the carrier 49.

Furthermore, the coil 50 can alternatively be arranged on the opposite side of the carrier 49 from the coil 51 and the circuit 76 can be provided directly above this coil 50 or within the coil 50. Thus, in turn, a compact and flat sensor element 17 can be created. Alternatively, the outer coil 50 can be arranged on the carrier 49 opposite the inner coil 51 and can at least partially cover it when the viewing direction is towards the measuring surface.

The sensor element 17 of the measuring probe 11, which sensor is fitted on a measuring surface 81, shows that the coils 50, 51 of the winding device 44 can be approximated very close to a measuring surface of the object to be measured, in order to determine a layer thickness 83 on a base material 82 or workpiece carrier. In this case, the spherical positioning cap preferably fitted on the layer 83 solely in the region of pole cap 58.

Figure 3:
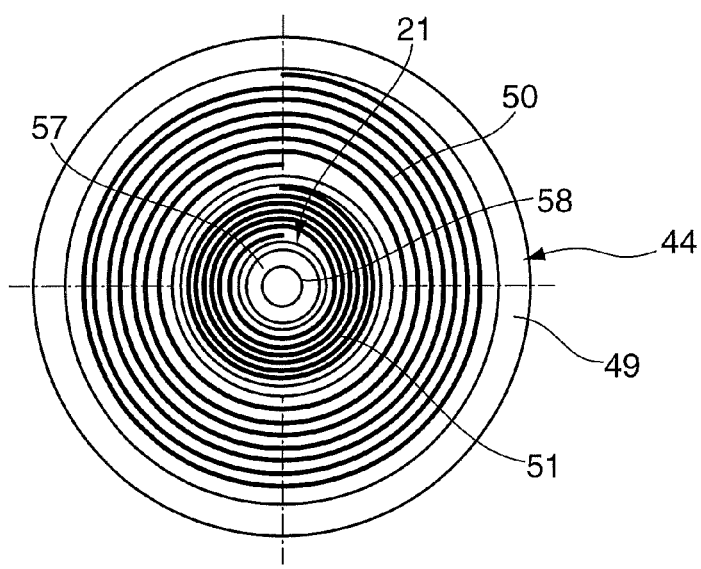

A schematic view from below onto the sensor element 17 according to FIG. 2 is depicted in FIG. 3. Here can be seen the ratios of the pole cap 58 to the rounded bearing surface 57, as well as the diameter of the coils 51, 50.

Figure 4:
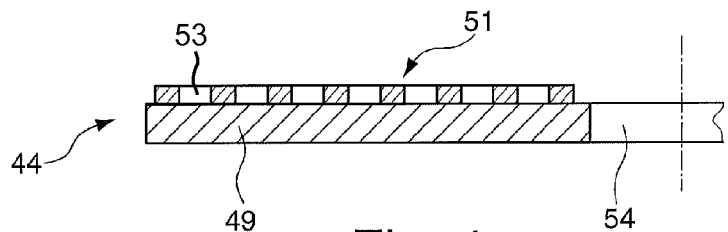

The first winding device 44 is sectionally depicted in a schematically enlarged view in FIG. 4. According to a first embodiment, the carrier 49 consists of germanium or, in particular, silicon, and has, for example, a layer thickness of 100 µm. A single-layer coil is applied to this carrier 49 as an Archimedean coil 51.

In the first embodiment according to FIG. 4, in order to produce this Archimedean coil 51, first the carrier 49 has a metallic conductive layer, in particular a copper layer, added to it. This can have a thickness of less than 0.1 mm, for example. The thickness is particularly in a region of approximately 0.01 mm. Then the Archimedean coil 51 is produced by means of laser removal, wherein a line width of, for example, 0.019 mm preferably remains at a thickness of 0.01 mm and a space in a range from 0.1 mm to 0.05 mm, in particular 0.01 mm, remains between the individual windings. An insulating layer or protective layer 53 can be applied to this coil 51, for example in the form of a lacquer or similar.

In the carrier 49, which is, for example, formed from silicon, a disc with a diameter of 3 mm and a thickness of 0.2 mm can apply a single-layer Archimedean coil 51. A spherical positioning cap 21 with a core 57 made from ferritic material is preferably inserted into a concentric inner hole 54 of the carrier 49. The probe 17 is preferably used for measuring the eddy current in conjunction with a preferably single-layer Archimedean coil 51 on the carrier 49 with a sufficient number of windings. The field of the single-layer coil 51 is concentrated by the pole cap 58 in such a way that the spatial expansion of the field is extremely low. For the moment, it is sufficient for the length of the ferritic pole 58 to correspond approximately to the median diameter of a single-layer Archimedean coil 51. If the cylindrical ferritic pole 58 on the end with the central pin 59 or with a core made from soft iron is elongated, the permeability of such an arrangement is only altered to a minor degree. With the introduction of a second coil arrangement, which is operated at low-frequency, the mode of operation of the single-layer Archimedean coil 51 in the eddy current operation is not affected.

An etching method is used as a further alternative to the production of the coil 51 on the carrier 49 to form the Archimedean coil 51. Furthermore, a vapour deposition method of metallic layers on the carrier 49 can alternatively be used.

Figures 5, 6:
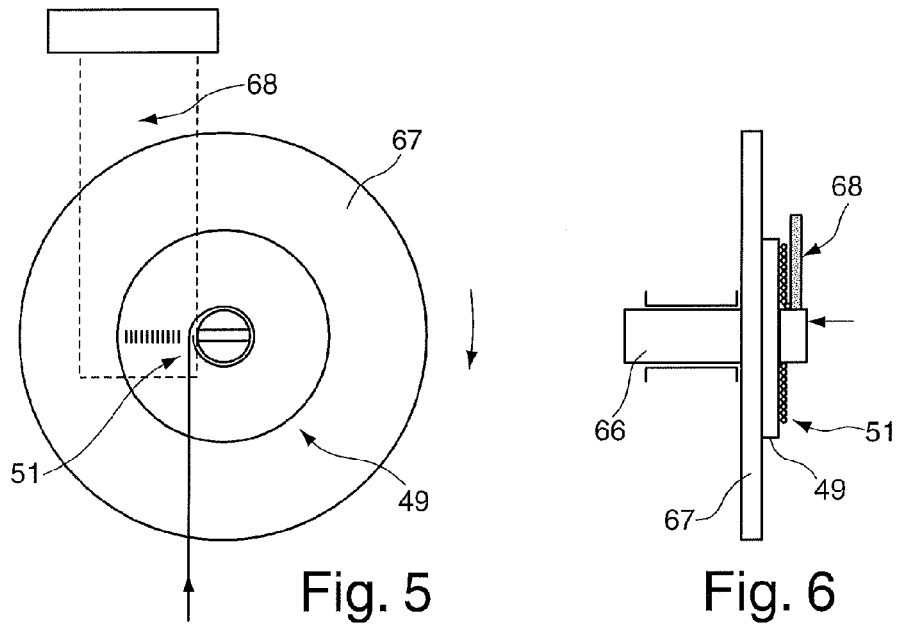

A further alternative embodiment for the production of the first winding device 44 is depicted in FIGS. 5 and 6. For example, the carrier 49 is applied to a winding axis 16, which adjoins a base plate 67. A gap width to the carrier 49 is formed by a press-on element 68, in particular a press-on film, wherein the gap to the adjacent winding is adjusted by a corresponding feed and an adhesion of the respectively supplied winding takes place via the press-on element 68. Such a winding technique is even possible with filigree structures such as the present invention, wherein the total diameter of the carrier 49 is less than, for example, 3 mm.

The winding device 44 is preferably designed to be single-layer. Alternatively, a single-layer arrangement can be selected, yet two or more coils 51, 50 can be provided, which each have an Archimedean arrangement and lie one behind the other or alongside one another. Furthermore, several layers of coils 51 can alternatively be arranged above one another, which, however, are separated by an electrical insulation or an insulating layer. Likewise, a combination of coils 51, 50 located above one another and alongside one another or one behind the other can also be enabled.

In the construction of the sensor element 17, the carrier 49 can furthermore consist of a silicon disc and a circuit of the winding device 44 having a first and/or second coil 50, 51 can be integrated or implemented into this material. Alternatively, the carrier 49 can consist of another, non-magnetic and electrically non-conductive material and, additionally, a silicon disc can be allocated to this carrier 49, in which the at least one circuit is contained. In this embodiment, the flexibility is increased for the positioning of the circuit 76 in the sensor element 17. During the integration of the circuit 76 in the carrier 49, which receives the at least one Archimedean coil 51, a further reduction in the construction size is possible. The smaller such sensor elements 17 are designed, the greater the independence from disturbances is the measurement of the thickness of thin layers, in particular a radius of curvature of surfaces to be checked. Furthermore, the advantage is thus achieved that short and simple line connections are provided from the circuit 76 to the winding device 44 and a central line can be fed out of the housing 73.

With respect to the dimensioning of the diameter of a core section 57 of the spherical positioning cap 21 produced from ferrite, provision is preferably made for this to correspond to half the diameter of the median diameter of the coil 51 of the winding device. Likewise, the diameter of the core section 57 of the spherical positioning cap 21 can be designed to be larger.

Figure 7:
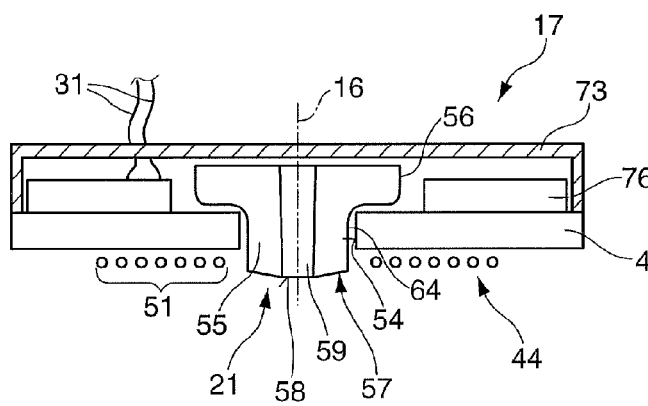

An alternative embodiment of a sensor element 17 to FIG. 2 is depicted in FIG. 7. In this exemplary embodiment, a spherical positioning cap 21 according to the embodiment in FIG. 2 is in turn provided. The winding device 44 with only one coil 51 and the circuit 76 are positioned on the carrier 49. The sensor element 17 is closed by the sensor housing 73. Such a flat sensor element 17 enables a measurement of the layer thickness according to the eddy current method.

An alternative embodiment of the spherical positioning cap 21 provides, instead of the hard metal core 59, a hard metal coating for the embodiment of the pole cap 58. This hard metal coating can extend completely above the rounded bearing surface 57—but also only in the region of the pole cap 58 that is depicted as an example in FIG. 4. Thus, in turn, the brittle ferrite can be protected, such that the spherical positioning cap 21 is provided with a higher level of mechanical stability.

Figure 8:
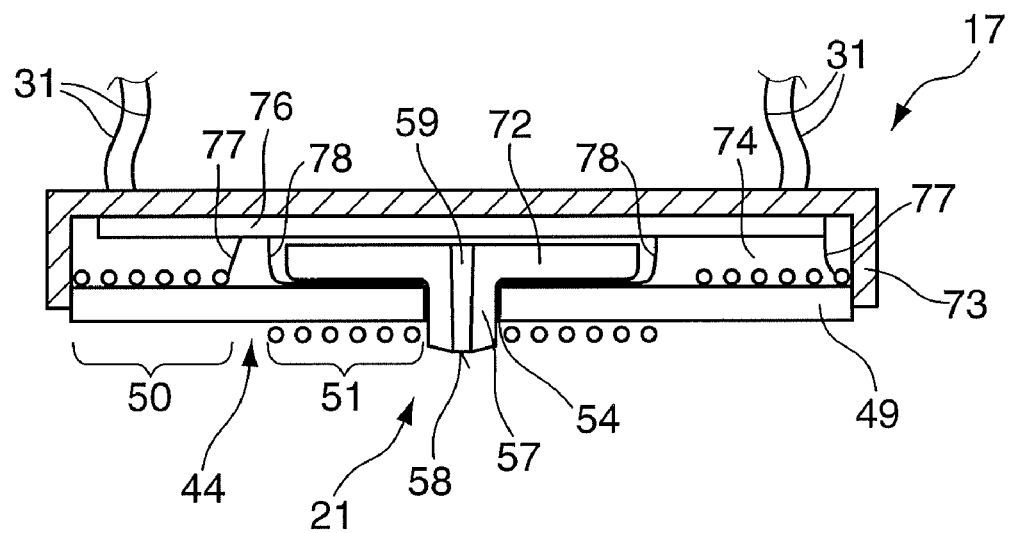

An alternative embodiment of a sensor element 17 to FIG. 2 is depicted in FIG. 8. In the case of this sensor element 17, both the first coil 51 and the second coil 50 are designed as Archimedean coils. In a passage opening 54 of the carrier 49, a spherical positioning cap 21 is passed through, which is preferably formed from a ferritic material such as an expanded core section 72 arranged on the rear of the carrier 49. This core section 72 preferably extends in a radial extension direction opposite the coil 51, preferably in accordance with the diameter of the coil 51. The carrier 49 is received by the sensor housing 73. This arrangement and fixing of the carrier 49 to the sensor housing 73 can take place in an adhesive, latching or plug and/or clip connection. A casting compound can be introduced into a free space 74 between the carrier 49 and the sensor housing 73. Alternatively, this can also be designed as an air space.

In this embodiment according to FIG. 8, provision is made for the second coil 50 to be formed analogously to the first coil 51 and to enclose it, and also to be supported on the carrier 49. According to a first embodiment, the second coil 50 is arranged opposite the first coil 51, as is depicted in FIG. 8. Alternatively, both coils 51, 50 can also be arranged on the same side of the carrier 49. Both coils 51, 50 are preferably formed in a single layer as an Archimedean coil. Thus, during the measurement, these coils 50, 51 are positioned virtually directly next to the measuring surface, such that the measuring sensitivity is increased.

This sensor element 17 can furthermore comprise a circuit 76, which is arranged, for example, on an inner side of a base of the sensor housing 73. A simple, internal contacting of the coils 51, 50 with the connecting lines 77, 78 can thus take place. Connection points or contact points are preferably provided on the carrier 49, such that a simple connection of the connecting lines 77, 78 is enabled. Alternatively, the circuit 76 can also be provided on an outer side of the sensor housing 73. Likewise, the circuit 76 can be implemented in the carrier 49. The recorded data is transmitted to the data processing device by the connecting cable 12 via access lines 31 leading out of the sensor housing 73.

Figure 9:
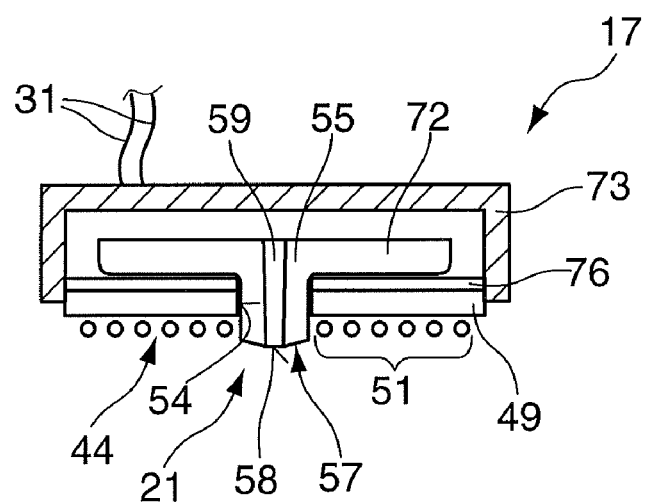

A further alternative embodiment of a sensor element 17 is depicted in FIG. 9. In this sensor element 17, provision is made for this to only be able to be used for measurement according to the eddy current method. This sensor element 17 virtually corresponds to the embodiment according to FIG. 8, wherein a second coil 50 is not provided.

This sensor element 17 comprises a winding device 44 having an Archimedean coil 51, which is applied to the carrier 49, preferably in a single layer. The carrier 49 is fastened to the core section 72. The core section 72 preferably consists of ferritic material. Likewise, the spherical positioning cap 21 is formed from ferritic material and is preferably connected as a single piece to the core section 72. This carrier 49 with the core section 72 and winding device 44 arranged thereon can be received by a sensor housing 73, which can be inserted into a housing 14 according to FIG. 1 or a further housing of measuring probes. The carrier 49 according to FIGS. 8 and 9 can be designed according to the alternatives described above. The same applies for the winding device 44 applied thereto.

Due to the configuration and arrangement of the sensor element 17 having the first and second coil 50, 51, the measuring sensitivity for thin layers is thus increased by a high field concentration being achieved by the configuration of the ferrite core with respect to the second coil 50. An improved resolution and measuring accuracy can thus be achieved.

The invention claimed is:

1. A measuring probe for measuring the thickness of thin layers comprising a housing and at least one sensor element moveable in the housing along a longitudinal axis during positioning of the measuring probe while in use, the at least one sensor element having:
   at least one winding device disposed about the longitudinal axis, and
   a spherical positioning cap facing an outer front face of the housing, said positioning cap being arranged in the longitudinal axis,
   wherein the spherical positioning cap has a basic body that has a cylindrical core section and a pole cap at a front face of the cylindrical core section,
   wherein the winding device is disposed about the spherical positioning cap, said winding device being formed from a discoidal or annular carrier with at least one Archimedean coil arranged thereon, and
   wherein the basic body of the positioning cap includes a ferritic material and the pole cap includes a hard metal.

2. The measuring probe according to claim 1, wherein a rounded bearing surface is provided on the cylindrical core section, the rounded bearing surface having the pole cap arranged in the longitudinal axis and the pole cap extends over the rounded bearing surface or is configured to be smaller than it.

3. The measuring probe according to claim 1, wherein the pole cap is formed by a hard metal coating, or a hard metal core which extends completely through the basic body.

4. The measuring probe according to claim 2, wherein the rounded bearing surface is formed with a diameter that is smaller than the core section and the rounded bearing surface is provided on a tapered holding section opposite the core section, which holding section has a rounded or tiered transition to the core section and the carrier is arranged on the holding section of the basic body.

5. The measuring probe according to claim 4, wherein the height of the holding section from the basic body corresponds at least to the thickness of the annular or discoidal carrier.

6. The measuring probe according to claim 1, wherein the spherical positioning cap consists of iron oxide or a plastic material with iron particles.

7. The measuring probe according to claim 1, wherein the winding device comprises a single-layer Archimedean coil on the carrier.

8. The measuring probe according to claim 1, wherein the Archimedean coil of the winding device is positioned pointing outwards towards the front face of the housing.

9. The measuring probe according to claim 1, wherein at least one second coil is provided on the carrier, which is formed as at least one further Archimedean coil and is arranged on the same or an opposite side of the carrier.

10. The measuring probe according to claim 1, wherein the winding device has a first coil formed as the at least one Archimedean coil, and a second coil formed as at least one further Archimedean coil, wherein the first and second coils are arranged opposite each other on the carrier; and the first coil, which comprises a larger number of windings than the second coil, at least partially covers this second coil.

11. The measuring probe according to claim 1, wherein the winding device has a first coil formed as the at least one Archimedean coil, and a second coil formed as at least one further Archimedean coil, wherein the first coil has fewer windings than the second coil and the first coil is provided for measuring the layer thickness and the second coil is provided to determine a deviation of the measuring surface from a plane, wherein the coils are operated with a frequency of greater than 1 MHz.

12. The measuring probe according to claim 1, wherein an insulating layer is applied to the at least one Archimedean coil of the winding device.

13. The measuring probe according to claim 1, wherein the carrier of the winding device is fastened to the front section of the spherical positioning cap adjacent to the pole cap, or bordering this, by an adhesive, latching or plug connection.

14. The measuring probe according to claim 1, wherein the carrier consists of an electrically non-conductive and non-magnetic material, which is designed to be flatly discoidal or annular.

15. The measuring probe according to claim 1, wherein the carrier is formed from a semi-conductive material, which has a thickness of less than 300 μm.

16. The measuring probe according to claim 1, wherein the spherical positioning cap includes an expanded, ferritic core section which is arranged on the carrier opposite the first coil and covers the first coil in the radial extension direction.

17. The measuring probe according to claim 1, wherein the carrier is made from a semi-conductive material comprises an implemented or inscribed circuit, at least for the winding device.

18. The measuring probe according to claim 17, wherein the carrier having the implemented circuit or the inscribed circuit is arranged on an inner side of a sensor housing or on a front face of the sensor housing.

19. The measuring probe according to claim 17, wherein the winding device has a first coil formed as the at least one Archimedean coil, and a second coil formed as at least one further Archimedean coil, and wherein the carrier having the implemented circuit is arranged between the first and the second coil of the winding device.

20. A method for the production of at least one sensor element, having at least one winding device for a measuring probe according to claim 1, comprising: providing the annular or discoidal carrier; applying the at least one Archimedean coil to the annular or discoidal carrier, the at least one Archimedean coil with connecting contacts to the carrier; wherein the at least one Archimedean coil is applied to the carrier by applying a metallic conductive layer to the carrier and the at least one Archimedean coil is produced by removal of material, or the at least one Archimedean coil is applied to the carrier by a vapour deposition process, or the at least one Archimedean coil is applied to the carrier by a winding process, or the at least one Archimedean coil is applied to the carrier by adhering a winding wire to the carrier and fastening the winding wire to the carrier using a press-on element during or after the winding process.

\* \* \* \* \*